United States Patent

Heusinkveld

[15] 3,640,727

[45] Feb. 8, 1972

[54] COFFEE BREWING PACKET

[72] Inventor: Merlyn R. Heusinkveld, Springfield Township, Hamilton County, Ohio

[73] Assignee: The Procter & Gamble Company, Cincinnati, Ohio

[22] Filed: June 26, 1970

[21] Appl. No.: 50,365

Related U.S. Application Data

[63] Continuation-in-part of Ser. No. 849,169, Aug. 11, 1969, abandoned, which is a continuation-in-part of Ser. No. 763,411, Sept. 27, 1968, abandoned.

[52] U.S. Cl. ..............................................99/77.1, 99/171 P
[51] Int. Cl. .......................................A23f 1/08, B65d 29/02
[58] Field of Search ..........................99/65, 68, 77.1, 171 I

[56] References Cited

UNITED STATES PATENTS

| | | | |
|---|---|---|---|
| 1,903,362 | 4/1933 | McKinnis | 99/65 |
| 2,281,320 | 4/1942 | Odell, Jr. | 99/68 |
| 2,531,594 | 11/1950 | Abrahams | 99/77.1 |
| 3,183,096 | 5/1965 | Hiscock | 99/77.1 |
| 3,386,834 | 6/1968 | Noiset et al. | 99/77.1 |
| 3,387,553 | 6/1968 | Tavera | 99/77.1 X |
| 3,420,675 | 1/1969 | Costas | 99/77.1 |
| 3,511,666 | 5/1970 | Hudson et al. | 99/65 X |

*Primary Examiner*—Frank W. Lutter
*Assistant Examiner*—William L. Mentlik
*Attorney*—Edmund J. Sease and Richard C. Witte

[57] ABSTRACT

A coffee packet, containing flaked coffee particles in a water-permeable pouch, for brewing coffee is disclosed.

12 Claims, No Drawings

COFFEE BREWING PACKET

CROSS-REFERENCE

This is a continuation-in-part application of my copending application, Ser. No. 849,169, filed Aug. 11, 1969, now abandoned, which application is a continuation-in-part of Ser. No. 763,411, filed Sept. 27, 1968, now abandoned.

FIELD OF THE INVENTION

This invention relates to a coffee packet for the brewing of coffee. Additionally, this invention relates to a coffee packet of a water-permeable pouch containing coffee particles whereby a coffee beverage is brewed by the infusion of hot water through the pouch into contact with the coffee particles inside the pouch. More particularly, this invention relates to a coffee packet containing flaked coffee in a water-permeable pouch for the brewing of coffee.

BACKGROUND OF THE INVENTION

The use of packets for the brewing of tea is commonplace. Tea has been marketed in tea bags for many years and has enjoyed a great deal of commercial success. Packets, particularly water-permeable packets, containing roasted and ground coffee are also old and well known in the art. Many attempts have been made to prepare a packet for the brewing of coffee in an attempt to duplicate the success of the tea bag but have not resulted in the commercial success and ready acceptance of the tea bag.

Examples of coffee in a packet as an old and well-known product in the art are as follows: C. B. Holland in U.S. Pat. No. 1,454,739 discloses a substantially circular cartridge constructed from a suitable fabric material containing coffee for use in a percolator; L. H. Abrahams in U.S. Pat. No. 2,531,594 discloses coffee packaged in a nonwoven fabric "tea bag"; in addition, E. F. Hiscock in U.S. Pat. No. 3,183,096 discloses a coffee packet of a synthetic filter paper containing particles of coffee. The coffee packets heretofore known had definite disadvantages. For example, to obtain a satisfactory coffee beverage, e.g., one with acceptable flavor and strength characteristics, the level of sediment or the amount of fines in the coffee beverage was too high to be acceptable. Conversely, to reduce the level of sediment to an acceptable level, the coffee beverage obtained was unsatisfactory in strength and flavor characteristics.

The compressing or flaking of coffee also is well known in the art. R. B. McKinnis in U.S. Pat. No. 1,903,362 discloses the subjection of coffee to a mechanical pressure to crush the particles, to reduce the outgassing of coffee and to give a better flavored brew. F. P. McColl, et al., in U.S. Pat. No. 1,535,233, disclose the crushing of roasted coffee beans to liberate the oil contained in the cells and the fiber to obtain an impermeable tablet.

Other patents exist in the art where coffee is compacted or compressed into a tablet or disc. Examples of these patents are J. C. Donnelley, U.S. Pat. No. 2,235,315; J. Brenzinger, U.S. Pat. No. 2,345,320; F. L. Savageau, U.S. Pat. No. 1,210,542; and H. Jeszenik, Austrian Pat. No. 197,187. The primary import of these patents is the compressing of coffee into a tablet or disc to prevent the outgassing of coffee, to minimize the action of air or oxygen on the flavor and aroma components, and to obtain a stronger and more flavorful brew.

As can be seen from the art hereinbefore cited, pressing of coffee into a tablet or disc and the packaging of coffee in an infusable, water-permeable packet are well known in the art. However, it was not known in the art to use flaked roasted coffee in a water-infusable package to obtain the advantages available in using flaked coffee and a water-permeable packet. These combined advantages are numerous and unexpected. When flaked coffee is used, less coffee is needed per cup to brew a beverage of comparable strength than is the case with loose or tableted ground coffee in a packet, because flaking disrupts the cellular structure of coffee allowing a beverage of greater strength to be obtained using the same amount of coffee. A more flavorful beverage is obtained when coffee is brewed from flaked coffee due to the extraction from flaked coffee of more of the flavor components. The packeting of coffee results in less sediment and oil in the beverage since the beverage is filtered by the packeting material. One of the well-known problems in preparing a coffee beverage is consistency in measuring the correct amount of coffee for the flavor and strength desired. The packeting of coffee with a preset amount of coffee in each packet eliminates this variability in measurement in the the preparing of a coffee beverage. The packeting of coffee also permits easy disposability of the coffee grounds once the beverage has been prepared.

Accordingly, it is an object of this invention to provide a new and novel coffee packet containing flaked coffee in a water-permeable pouch for the brewing of coffee. In addition it is an object of this invention to prepare a coffee packet for infusion brewing of coffee which is easy and simple to use. Additionally, it is an object of this invention to provide users and preparers of coffee beverages with an easy to dispose of coffee brewing packet containing flaked coffee in a water-permeable pouch. It is also an object of this invention to provide a coffee packet which will reduce variability and aid consistency in measurement in the preparing of a coffee beverage by providing a coffee packet containing a premeasured amount of coffee for each cup to be prepared.

SUMMARY OF THE INVENTION

This invention, in its broadest aspects, is a coffee packet for the brewing of coffee comprising (1) coffee flakes, said coffee flakes being obtained by roll-milling of roasted coffee; and (2) a pouch containing said coffee flakes, said pouch being comprised of a water-permeable material.

DESCRIPTION OF THE INVENTION

In order to accomplish the objects of this invention, whole coffee beans are first roasted in the usual way and then ground, broken or cut to a suitable size. In the normal operation of preparing conventional roasted and ground coffee, coffee beans are roasted in a hot gas media whereby the coffee bean temperature is raised to a temperature of from about 350° F. to about 425° F. with the time of roasting being dependent on the flavor characteristics desired in the coffee beverage when brewed. Where coffee beans are roasted in a batch process, the batch roasting time at the hereinbefore given temperatures is from about 10 minutes to about 20 minutes. Where coffee beans are roasted in a continuous process, the residence time of the coffee beans in the roaster are from about 4 minutes to about 8 minutes, preferably about 5 minutes. Subsequently the roasted coffee is passed through a grinder to obtain either the traditional "regular," "drip," or "fine" grind. The degree of coarseness or fineness of the resulting grind is dependent upon the brewing method by which the coffee beverage is to be prepared, e.g., "regular grind" is normally recommended for use in a percolator, "drip grind" is normally recommended for use in a drip pot, and "fine grind" is normally recommended for use in a vacuum pot.

In preparing the flakes for use in the coffee packet of this invention any of the grinds described above and in general use in the coffee industry can be used. The standards of these grinds, as suggested in the 1948 Simplified Practice Recommendation by the U.S. Department of Commerce (See "Coffee Brewing Workshop Manual," p. 33 published by the Coffee Brewing Center of the Pan-American Coffee Bureau), are as follows: "regular grind," 33 percent is retained on a 14-mesh Tyler standard sieve, 55 percent is retained on a 28-mesh Tyler standard sieve, and 12 percent passes through a 28-mesh Tyler standard sieve; "drip grind," 7 percent is retained on a 14-mesh Tyler standard sieve, 73 percent on a 28-mesh Tyler standard sieve, and 20 percent passes through a 28-mesh Tyler standard sieve; and "fine grind," 100 percent passes through a 14-mesh Tyler standard sieve, 70 percent being retained on a 28-mesh Tyler standard sieve and 30 percent passing through a 28-mesh Tyler standard sieve. It is preferred that "regular grind" be used because with finer grinds a somewhat higher incidence of fine particles is present in the coffee beverage, i.e., the finer the grind the higher the incidence of fine particles.

Espresso grind, although not a common grind, is a finer grind than "fine grind" and is designed for use in espresso pots. Espresso grind can also be used in forming the flakes for use in the coffee packet of this invention. A relatively new grind designed primarily for use in automatic electric percolators is also being used in the coffee industry. This grind is somewhat coarser than "regular grind" and is sold under various trade names, e.g., Electra-Perk, Lectric Perk and Electro-Perk. The electric percolator grind is also suitable for use in forming the coffee flakes used in the coffee packet of this invention.

Although the preferred embodiment of the flaking operation to prepare the flaked coffee for use in the coffee packet of this invention is the use of ground coffee, it is contemplated that roasted whole coffee beans can be roll milled alone without any intermediate grinding operation. It will be appreciated that where whole coffee beans are used much larger rolls are necessary to crush the beans and form the flakes of coffee. In addition force feeding of the whole roasted beans into the rolls may be necessary due to the difficulty of small rolls in "nipping" larger particles of individual beans.

The roasted and ground coffee is subsequently subjected to a mechanical pressure by passing the roasted and ground coffee particles through parallel rolls of a roll mill. This results in the preparation of flakes of coffee, that is, the coffee particles are flattened out and elongated into flakes due to the flaking or roll mill operation. The flakes of coffee are formed simply by passing coffee through two parallel smooth or highly polished rolls so that the coffee particles passing between the rolls are crushed, flattened and formed into flakes. Smooth or highly polished rolls are desirable because these rolls are easy to clean. Other rolls can be used if the desired flaking of the coffee can be obtained. These flakes form integral units, are moderately firm, and can be easily handled. The coffee flakes can also be passed through a series of roll mills but in the preferred embodiment for forming the coffee flakes for use in the coffee packet of this invention passage of the coffee particles through two parallel rolls is used.

The flaking operation involves the passing of roasted and ground coffee particles between smooth rolls and results in these coffee particles being crushed and dropped from the rolls in the form of flakes. The roll milling, or flaking, of coffee can be accomplished in any of the well-known and commercially available roll mills, e.g., those sold under the trade names of Lehmann, Thropp, Farrel, Lauhoff, etc.

The temperature of operation of the roll mill in forming the flakes of coffee is normally from about 32° F. to about 300° F., preferably from about 50° F. to about 150° F. The temperature of the flaking of the coffee is not critical. Extremely high temperatures are to be avoided because degradation of the flavor and aroma components of the roasted coffee can result and extremely low temperatures necessitates the use of refrigeration equipment. In the usual method of operation, the coffee immediately after being ground is passed through the roll mill to obtain the flakes. The ground coffee can be allowed to cool to room temperature and subsequently passed through the roll mill to form flakes.

The pressures exerted on the ground coffee by the rollers in the roll mill to prepare the coffee flakes for use in the coffee packet of this invention can range from low pressures to high pressures. Suitable pressures which can be used can be found in the copending application of Frederick M. Joffe, Ser. No. 823,954, filed May 12, 1969, for Flaked Coffee Product, abandoned in favor of a continuation-in-part application, Ser. No. 30,246, filed Apr. 20, 1970.

Flakes can be made with one pass through a two-roll mill, having roll diameters within a wide range, e.g., as small as about 2 inches or smaller and as large as about 80 inches or larger, preferably from about 3 inches to about 30 inches, and operating at peripheral speeds of about 1 foot per minute up to about 500 feet per minute, preferably from about 10 feet per minute to about 250 feet per minute. The optimum yield of desirable flakes is generally obtained when the rolls operate at approximately the same speeds. Different roll speeds, however, can be utilized. Roll speed ratios in excess of 1.5:1 are not desirable. Preferably, the roll speed ratio is within the range of from about 1:1 to about 1.4:1.

The moisture level of the coffee to be flaked is not a critical consideration and can range from about 2 percent to about 8 percent on a coffee weight basis. It is preferred that the moisture level be that of the coffee after it is ground, i.e., from about 2.5 percent to about 6 percent. An extremely low moisture content is to be avoided because the resulting flake is brittle, and with a high moisture content water extrusion during roll milling occurs and there is an increased incidence of staling of the coffee flake.

The flaked coffee obtained from the milling operation is in the form of very thin flakes irregular in shape and size. The flakes often come off the rolls in irregular sheets of several square inches. The flakes produced have a thickness of from about 0.0005 inch to about 0.030 inch, preferably from about 0.005 inch to about 0.025 inch. The density of the flakes is not a critical consideration but will generally range from about 0.40 g./cc. to about 0.60 g./cc., preferably from about 0.43 to about 0.52 g./cc.

The use of flakes of coffee in a water-permeable packet has advantages over the use of loose or tableted ground coffee in a water-permeable packet. The customary grinds of loose ground coffee, i.e., regular, drip and fine, have a distribution of coarse particles, medium particles and fine particles. If a high percentage of coarse particles is present in the ground coffee in the packet used in preparing a coffee beverage, underextraction results and a weak, unacceptable coffee beverage is obtained. This can be counteracted to some extent by the use of finer particles. Where, however, the ground coffee in the packet contains a high percentage of fine particles an unacceptable level of coffee fines, or sediment will result in the coffee beverage. Increasing the time of brewing of the packet containing loose ground coffee does yield a stronger coffee beverage but also results in a bitter flavor. Since the coffee is packeted in a packeting material, the ability of water to infuse through the coffee particles decreases. As a result of the above factors with loose ground coffee in a packet, the necessity for fine particles of coffee to obtain the proper extraction results in an unacceptable level of sediment in the coffee beverage. With respect to compressed tablets, while the high levels of pot sediment have been eliminated, the use of a compressed cohesive tableted mass of ground coffee has the inherent disadvantage involved with all nonparticulate products, i.e., weaker beverages are produced.

The problems which exist with heretofore known coffee packets (e.g., loose ground or tableted coffee in a water-permeable packet) can be eliminated by using flaked coffee in a water-permeable pouch. That is, when using flaked coffee in combination with a water-permeable pouch, a product which is of excellent extractability results and, very importantly, high extractability is achieved without increasing the level of pot or cup sediment which builds up during the percolation process. In other words, the dilemma faced in the prior art which teaches fine ground particles to improve extractability, but which particles pass through the coffee pouch material and cause high levels of pot and cup sediment, or the alternative teaching of coarse particles and/or compressed tablets which prevent sediment but result in weaker brews, has been solved. Particulate flaked coffee in a pouch provides extractability equal to or better than particulate roast and ground coffee and does not provide the high level of pot and cup sediment which highly particulate roast and ground coffee provides; on the other hand, the problem of pot and/or cup sediment is eliminated without any sacrifice in beverages strength or quality as occurs when using coarse particles and/or tableted cohesive masses of coffee in a pouch.

As previously indicated, the combination of flaked roast and ground coffee and a water-permeable filter pouch provides a highly extractable product which produces beverage of uniform strength and quality and a product which does not produce high levels of cup and/or pot sediment. No other known pouched product, particulate or otherwise, provides both of these advantages simultaneously. Previous patents teach the necessity of finely grinding particles and carefully controlling the pore size of the filter fabric. Fine grinding accomplishes size reduction in all dimensions. As the particles become smaller, they are more extractable as taught by the prior art, but also have the ability to pass through smaller openings in the filter fabric material and of course this results in cloudy brews and high levels of cup and pot sediment. Flaked coffee, on the other hand, accomplishes high levels of extraction in a different way, which results in less sediment for a given level of extraction. Whereas fine grinding promotes extractability by increasing the surface area of the coffee particles which allows a higher rate of diffusion, flaking promotes extractability primarily by rupturing cells which also promotes a higher level of diffusion. Thus, the key difference is that flaking produces higher levels of extractability by reducing particle size in one dimension only, whereas fine grinding reduces particle size in all dimensions more or less uniformly. Because most coffee flakes are much larger than most finely ground coffee particles in all but one dimension, there is much less tendency to pass through even large pores in a filter fabric. Finely ground particulate coffee, on the other hand, passes through even very small fabric filter pores and results in high levels of pot and cup sediment.

The flaked form of coffee used in a coffee packet thus gives a better flavored beverage due to the rapid and uniform extraction during brewing and due to the accessibility to the extracting water of the better flavor components in the coffee. In addition, less coffee is necessary to produce an equally strong beverage and less time is required for making the beverage with flaked coffee in a packet than is the situation with coffee packets containing ground, even finely ground coffee.

The coffee flakes formed for use in the coffee packet of this invention are mechanically strong but can be tempered prior to the passing of the coffee particles through the rolls of the roller mill. The plasticity of the coffee particles may be modified by adding moisture to the coffee particles or heating the coffee particles prior to flaking. The moisture control can be accomplished by the passing of steam or a small amount of water over the coffee beans just prior to grinding or just after grinding. In addition the coffee particles may be tempered by passing them through the roll mill while they are still hot from grinding or by heating the rolls of the roll mill. When the tempered coffee particles are passed through rolls the flakes formed retain their structural integrity and are more easily handled.

In forming the coffee flakes for use in the coffee packet of this invention no added binder material is used in compacting or compressing the ground coffee particles into coffee flakes, and it should be pointed out that any moisture and oil extruded due to the pressure used in the flaking of the coffee particles will, to a certain extent, act to preserve the structural integrity of each individual coffee flake. As has hereinbefore been mentioned, the strength of the coffee flakes will be dependent upon the moisture level of the coffee used, the pressure used in forming the flakes, and the degree of roasting used in the preparation of the roast and ground coffee particles prior to flaking.

It is to be understood that the preferred embodiment of the flakes to be used in the coffee packet of this invention is the use of flakes of roast and ground coffee. In this preferred embodiment green coffee of different qualities and flavor characteristics are blended and this blend is subsequently roasted, ground and then milled into coffee flakes. In addition the coffee flakes can be formed by roasting, grinding and flaking of coffee beans of specific qualities and flavor characteristics. These coffee flakes can be then blended with other flaked coffees prepared from coffee beans having additional specific qualities and flavor characteristics to obtain the flavor characteristics desired in the end product. In another embodiment of the coffee flakes for use in the coffee packet of this invention, green coffee beans can be roasted to different roast colors (e.g., different degrees of roasting), the different roast colors blended, and the roasted coffee ground before forming the coffee flakes, or the green coffee beans can be roasted to specific roast colors and the roasted coffee ground. The roasted coffee can be subsequently flaked and the flakes of different roast coffee flakes blended. The approach used (e.g., roasting, blending, grinding, then flaking or roasting, grinding, flaking then blending) will be dependent upon the flavor characteristics desired in the beverage prepared from the coffee packet, the economics of the processing steps involved in fabricating the coffee packet and the convenience of the processing steps involved. Flaked coffee in combination with loose ground coffee can also be used where it is desired to have a filled packet of a specific size but to prepare a milder flavored beverage than would be obtained if flaked coffee alone were used. For the coffee packet of this invention each of the above approaches is equally acceptable and can be used in preparing the coffee flakes for use in the coffee packet of this invention.

It is to be understood the term coffee, as used herein, is used in its broadest sense and includes coffee particles which have been decaffeinated or coffee particles in which flavor additives are used in admixture with the coffee.

The fabric which can be used to form the water-permeable pouch of the coffee packet of this invention is any type of fabric which is chemically inert and essentially taste-free. The coffee packet of this invention can be formed from both nonwoven and woven fabrics. Included within the class of nonwoven and woven fabrics are synthetic fabrics made of rayon, nylon, polyesters, polyacrylic and polypropylene fibers and natural fibers made of hemp and cotton fibers. It is to be understood that in order to accomplish the advantages of this invention of type of fabric, whether a natural or a synthetic fabric, which is used should be essentially taste-free. In addition it will be appreciated that combinations of fibers can be used to prepare the fabrics suitable for use as the pouch material of the coffee packet of this invention, e.g., where greater fabric strength or increased fabric porosity is desired. Particularly preferred are the nonwoven fabrics comprising fibers of rayon, nylon, polypropylene, and hemp and mixtures thereof. It is immaterial for the purposes of this invention the type of fiber used as the water-permeable material for forming the pouch so long as it is chemically inert, essentially taste-free and sufficiently strong to remain an integral unit throughout normal handling, packaging, shipping of the coffee packet, brewing of the coffee beverage, and disposing of the spent packet.

It is essential that the fabric used for preparing the pouch of the coffee packet be permeable to water. Yet the pores in the fabric allowing water permeability should be of such a nature and size that the coffee flakes present in the packet do not pass through with the brewing water. The fabric must act as a filtering means to accomplish the objectives of preventing the formation of sediment in the brewed coffee. The fabric thickness used can vary but will generally range from about 0.002 in. to about 0.012 in., preferably from about 0.003 in. to about 0.009 in.

The size of the pores in the pouching material used in making the coffee packet of the present invention can vary in size from about 5 microns to about 1000 microns, preferably from about 20 microns to about 200 microns. If a substantial portion of the pores are smaller than approximately 5 microns, it may be impossible, irrespective of time, to extract all of the desired flavor components and constituents from the flaked coffee in the pouch into the brewed beverage since smaller pore sizes tend to clog during brewing of the coffee beverage. Where the pore size is extremely fine inordinately long brewing times are needed and with the high proportion of automatic brewing devices presently in use for brewing coffee small pore sizes would provide an unsatisfactory and unsavory cup of coffee. Pore openings larger than about 1000 microns are to be avoided since they permit passage of coffee fines into the beverage resulting in a high level of sediment. In addition pore sizes larger than about 1000 microns will allow the smaller particles to sift out on agitation, as for example on shipping, and a dusty coffee packet having an undesirable appearance can result.

The coffee packet of this invention can be of any shape so as to contain the flaked coffee. The shape to be used will be determined to a certain extent by the brewing method employed. The coffee packet of this invention can be used in any type of vessel. After brewing, the coffee packet containing the spent coffee particles may be easily disposed of as a unit.

The coffee packet of this invention is simply and easily formed. All that is necessary is to form a pouch out of the water-permeable materials hereinbefore described to contain the flaked coffee. This can be done by "drawstring" means whereby the pouch or packet is gathered at one end or by stitching the material together to form the packet. A preferred embodiment of this invention is the heat sealing of the water-permeable material to form a packet for the flaked coffee. In this preferred embodiment the heat sealing is accomplished through the use of a heat-sealing binder. The binders which are acceptable for heat sealing are those binders having a melting point lower than the softening or charring point of the pouching material but a melting point higher than the temperature of boiling water. In addition the binder, similar to the pouching material must be chemically inert and essentially taste-free. It is desired that the binder be sufficiently inert and insoluble in hot water so that no adverse physiological effect from consumption of the coffee beverage can result. Examples of suitable binders for heat sealing of the pouching materials described above are the polymeric binders, as for example, the polymeric binder described in U.S. Pat. No. 3,183,096.

The flaked coffee in a water-permeable pouch when dropped into boiling water for brewing results in a stronger and better flavor than can be obtained with the use of ground coffee in a packet. This is due to the fact that the brewing water receives and adsorbs the highest possible amount of flavor and aroma constituents of the coffee. The beverage will be of a higher concentration or specific gravity per unit of coffee used because of the disruption and breakdown of the cellular structure which occurs during flaking and the increased ability with which hot water can come in contact with the extractable flavor constituents.

The use of flaked coffee in a packet results in an additional advantage over the advantages hereinbefore discussed. The flaking of coffee results in the expulsion of $CO_2$ formed within the cells of the coffee during roasting. Thus, flaked coffee in packets can be packed in sealed containers either under vacuum or in an inert gas. No objectionable bulging or swelling of the walls of the container on aging results. Lighter weight materials can be used to package the coffee packets of this invention than can be used in the packing of ground coffee in a packet.

The methods for brewing coffee with the coffee packet of this invention are numerous. A coffee beverage can be brewed by placing the coffee packet in a pot of water which has been brought to a boil and allowed to cool just slightly (to about 180° F. to about 210° F.) and the coffee packet steeped in the hot water for from about 0.5 minutes with agitation of the packet to about 6 minutes with little or no agitation of the packet. The packet can then be removed and disposed of. A coffee beverage can also be prepared using the coffee packet of this invention and methods in general use for brewing a coffee beverage.

A very common method of brewing coffee is the use of either a nonelectric or electric percolator. A preferred embodiment of the coffee packet of this invention is a coffee packet to be used in the percolator basket. The coffee packet to be used in a percolator is approximately circular in shape. The center of the packet is punched out so that the coffee packet may be inserted directly into the percolator basket and fit around the percolator pump.

The coffee packet of this invention preferably is constructed so as to contain a specific amount of coffee designed for the brewing of one or more cups of coffee, e.g., one cup per packet, two cups per packet, four cups per packet, etc. The number of packets to be used can then be varied depending on the number of cups to be made. The brewing of the coffee beverage in a percolator using a coffee packet is the same as the brewing of a coffee beverage in a percolator using loose ground coffee. The brewing of coffee using a percolator is so well known as to render further discussion unnecessary. After from about 4 minutes to about 15 minutes of recirculating the brewing water with a standard size percolator pot, e.g., four cups to about 12 cups, the percolator cycle is completed. For larger size pots in which 30, 50, 90 or more cups of coffee are brewed at one time a proportionately longer brewing time is required. Once the brewing of the coffee beverage is complete the used coffee packets can be easily removed and discarded. It is apparent that the ability to dispose of spent coffee grounds in this manner is quite an advantage in that there are no undesirable loose wet grounds to dispose of and the cleaning of the pot for its next use is simplified.

The coffee packets of this invention can also be adapted for the drip method of preparation, for the vacuum pot method of preparation and for other preparation methods. Again all that is necessary is that the coffee packet be of a shape and design compatible with the brewing method. One skilled in the art can design such coffee packets within the spirit and scope of this invention.

Application of the principles involved in the coffee packet of this invention can be suitably employed for the production of a "tea bag" type of coffee packet in which the coffee packet is attached to a string. The packet is placed in a cup, boiling water is poured into the cup and the mixture allowed to steep for from about 0.5 minute with agitation to about 6 minutes with little or no agitation. The length of time of steeping and the amount of agitation used will depend upon the strength and flavor desired. This embodiment has the advantage that a single cup can be brewed at one time.

A preferred embodiment of this invention is a "tea bag" type of coffee packet having a triangular cross section, which packet can be formed from an elongated tube of the permeable fabric hereinbefore described. The tube is open at each end and has the desired quantity of coffee packaged therein. To form the packet, the tube is folded along two spaced, transverse lines to form three substantially equal compartments, each of which contains a substantially equal quantity of coffee. The open ends of the tube are brought together and folded over each other to effect a closure, which can be stapled to prevent inadvertent unfolding of the ends with consequent reopening of the tube. Preferably a string is provided to permit removal of the packet from a cup and this string can be attached to the packet by means of the staple. Thus, when formed, the packet comprises three substantially equal, generally rectangular, coffee-containing compartments arranged in end to end relationship to form a hollow packet of triangular cross section. Preparing coffee using this preferred embodiment is similar to the well-known method of brewing tea from a tea bag.

The amount of coffee in each packet is dependent on the number of cups of coffee that the packet is designed to brew but will depend somewhat on the brewing method used. For each cup to be brewed, the coffee packet of this invention can contain from about 5 g. to about 12 g. of flaked coffee per cup, preferably from about 5 g. to about 9 g. of flaked coffee per cup. It is to be understood that the number of cups per packet is not a critical consideration but a matter of convenience and marketing strategy. A consumer product embodying the principles of this invention can be designed within the above-described concepts for brewing one cup at one time to 90 or more cups at one time. The number of cups per packet can be so set so that more than one packet can be used depending upon the amount of coffee to be brewed. In addition within the packet the amount of flaked coffee per cup can be varied such that a stronger or milder beverage can be prepared. Accordingly, it will be appreciated that packets containing large amount, average amounts or small amounts of flaked coffee per cup can be prepared, advertised and sold for coffee drinkers who wish to be able to brew a strong, average or mild flavored coffee beverage.

EXAMPLE I

Five hundred pounds of green coffee beans were roasted in a Thermolo roaster at a bean temperature of about 400° F. for about 20 minutes. The roasted coffee was ground to a regular grind particle size distribution, e.g., 33 percent on 14 (Tyler), 55 percent on 28 (Tyler), and 12 percent through 28 (Tyler). Five pounds of the roast and ground coffee were passed through a Farrel roller mill having two parallel rolls 6 inches in diameter and 13 inches long, one-half inch of "nip" with 1,000 pounds per inch of nip. The peripheral roll speed was about 70 feet per minute. The flakes formed were approximately 0.015 inch in thickness and had a density of 0.48 g./cc. Thirty grams of the flakes were then placed on a circular piece (4 inches in diameter) of nonwoven rayon fabric, strengthened with polypropylene fibers, of 0.006 inch in thickness, having an average pore size of 50 microns and containing a heat-sealable binder. A second circular piece of the above-described fabric was placed over the coffee flakes and first piece of fabric. The periphery of the two fabric pieces were heated sealed together by applying a temperature of about 400° F. to the edges of the fabric for 0.5 seconds to form a pouch around the coffee flakes. The circular coffee pouch was then placed in 4 cups (24 fl. ozs.) of water at about 190°–200° F. At the end of 5 minutes the coffee packed was removed and discarded. Four cups of a coffee beverage having an acceptable strength and good flavor characteristics were obtained.

The procedure used in the above example is followed in forming the coffee packet except that the center of the coffee packet is heat sealed in addition to the edges and a hole is punched in the heat-sealed center to form a "doughnut"-shaped coffee packet. Substantially similar results are obtained when the packet is placed in the percolator basket of a percolator containing 4 cups (24 fl. oz.) of water and the coffee beverage is brewed using the percolator method of preparation. A coffee beverage having an acceptable strength and good flavor characteristics is obtained.

Substantially similar results are obtained when in the above example electric percolator grind, drip grind, fine grind, and espresso grind are substituted on an equivalent basis for the regular grind used in that a coffee packet for use in brewing a coffee beverage having acceptable strength and good flavor characteristics is obtained.

Substantially similar results are obtained when in the above example other synthetic fabrics such as nylon, polyester, polyacrylic and polypropylene and mixtures thereof, and natural fabrics such as hemp and cotton are substituted on an equivalent basis for the rayon fabric used above in that a coffee packet for use in brewing a coffee beverage having acceptable strength and good flavor characteristics is obtained.

Substantially similar results are also obtained when in the above example the packet is seamed by stitching the fabric together or when other fastening means are used to form the packet in that a coffee packet for use in brewing a coffee beverage having acceptable strength and good flavor characteristics is obtained.

EXAMPLE II

The procedure of example I was repeated to form seven coffee packets. Only packet A contained flaked roast and ground coffee which was identical to that produced in example I. The other packets contained ground coffee in the amount and grind size indicated in the table.

TABLE

| Packet | Coffee Form | Grams in Packet | % Soluble Solids | Sediment Level** |
|---|---|---|---|---|
| *A | Flakes | 28.4 | 0.94 | 9 |
| B | Ground regular grind | 37.5 | 0.86 | 6 |
| D | Ground fine grind | 28.8 | 0.775 | |
| B | Ground regular | 28.8 | 0.60 | 6 |
| C | Ground regular | 37.5 | 0.86 | 6 |
| D | Ground fine grind | 28.8 | 0.77 | 5 |
| F | Ground fine grind | 34.6 | 0.92 | 7 |
| F | Ground pulverized (through —40 screen) | 28.8 | 0.54 | 5 |
| G | Ground (pulverized) | 37.5 | 0.23 | 7 |

*Product of the invention

**Sediment level in the bottom of the percolator pot was determined visually by a panel of experts based upon the following scale:

taste 10 – none  taste 9 – slight taste  8 – moderate taste  7 – substantial taste  6 – heavy taste  5 – very heavy The coffee used in making the pot sediment tests indicated in the table was brewed in a 4-cup electric percolator. 178 milliliters of water were used/cup and the coffee was brewed until it reached 180° F.

The percent soluble solids was determined by refractive index determination. Methods of refractive index determination are well known and all that is involved is placing a drop of the sample on a mount, placing the mount in a refractometer and reading the instrument. From the index of refraction, and previously determined calibration values, the percent soluble solids is determined. For conventional particulate roast and ground coffee brewed as described above, the percent soluble solids is generally about 0.90–0.97 percent. Thus, as can be seen from the above table, the percent soluble solids obtained with flaked coffee in a pouch is equal to that of unpouched regular particulate roast coffee, and yet the flaked coffee in a pouch has the lowest pot sediment level of any of the tested forms of coffee.

What is claimed is:

1. A coffee packet for brewing of coffee products comprising:
   a. particulate compressed roast coffee flakes obtained by roll milling of roasted coffee said flakes having a substantial amount of cell rupture; and
   b. a pouch containing said coffee flakes, said pouch comprised of a water-permeable material.

2. The coffee packet of claim 1 wherein said coffee flakes have a thickness of from about 0.0005 inch to about 0.03 inch.

3. The coffee packet of claim 2 wherein said water-permeable material is selected from the group consisting of woven and nonwoven fabrics and wherein said water-permeable material has an average pore size of from about 5 microns to about 1000 microns.

4. The coffee packet of claim 3 wherein said fabrics are comprised of fibers selected from the group consisting of natural and synthetic fibers and mixtures thereof.

5. The coffee packet of claim 4 wherein said fabrics contain a heat-sealable polymeric binder.

6. The coffee packet of claim 5 wherein said fabric is comprised of natural fibers.

7. The coffee packet of claim 6 wherein said fibers are selected from the group consisting of cotton and hemp.

8. The coffee packet of claim 5 wherein said fabric is comprised of synthetic fibers.

9. The coffee packet of claim 8 wherein said fibers are selected from the group consisting of rayon, polypropylene, polyacrylic, polyester and nylon, and mixtures thereof.

10. The coffee packet of claim 9 wherein said fibers are selected from the group consisting of rayon and polypropylene and mixtures thereof.

11. The method for preparing the coffee packet of claim 1 comprising the steps of 1. forming particulate compressed roast coffee flakes from roasted and ground coffee said flakes having a substantial amount of cell rupture; and
2. forming a packet around said coffee flakes, said packet being formed from a water-permeable material.

12. The method of claim 11 wherein in step (1) the forming of the coffee flakes comprises the passing of roasted and ground coffee through a roll mill and wherein in step (2) the forming of the packet comprises heat sealing of a nonwoven fabric, said nonwoven fabric containing a heat-sealable polymeric binder.

* * * * *

PO-1050
(5/69)

UNITED STATES PATENT OFFICE
CERTIFICATE OF CORRECTION

Patent No. 3,640,727          Dated February 8, 1972

Inventor(s) Merlyn R. Heusinkveld

It is certified that error appears in the above-identified patent and that said Letters Patent are hereby corrected as shown below:

Col. 4, line 73, "beverages" should be -- beverage --

Col. 6, line 38, "of", first instance, should be -- the --

Col. 7, line 41 "adsorbs" should be -- absorbs --

Col. 10, in the Table, delete lines 8, 9, and 10.

Col. 10, in the Table, under the column headed "Packet", delete "F", first occurrence, and insert therefor -- E --.

Col. 10, line 21, delete "taste 10 - none taste 9 - slight taste 8 moderate taste 7 - substantial taste 6 - heavy taste 5 - very heavy" and insert therefor -- 10 - none
   9 - slight
   8 - moderate
   7 - substantial
   6 - heavy
   5 - very heavy --

Col. 10, in the Table, B and C should read -- Ground regular grind -- .

Signed and sealed this 26th day of December 1972.

(SEAL)
Attest:

EDWARD M. FLETCHER, JR.
Attesting Officer

ROBERT GOTTSCHALK
Commissioner of Patents